(12) United States Patent
Li

(10) Patent No.: US 9,944,162 B2
(45) Date of Patent: Apr. 17, 2018

(54) AUTOMOBILE BATTERY PROTECTION STRUCTURE

(71) Applicants: CHERY AUTOMOBILE CO., LTD, Wuhu (CN); WUHU POWER-TECHNOLOGY RESEARCH CO., LTD., Wuhu (CN)

(72) Inventor: Zhiming Li, Wuhu (CN)

(73) Assignees: CHERY AUTOMOBILE CO., LTD, Wuhu, Anhui (CN); WUHU POWER-TECHNOLOGY RESEARCH CO., LTD., Wuhu, Anhui (CN)

( * ) Notice: Subject to any disclaimer, the term of this patent is extended or adjusted under 35 U.S.C. 154(b) by 0 days.

(21) Appl. No.: 15/515,285

(22) PCT Filed: Oct. 19, 2015

(86) PCT No.: PCT/CN2015/092194
§ 371 (c)(1),
(2) Date: Mar. 29, 2017

(87) PCT Pub. No.: WO2016/062229
PCT Pub. Date: Apr. 28, 2016

(65) Prior Publication Data
US 2017/0217297 A1 Aug. 3, 2017

(30) Foreign Application Priority Data

Oct. 23, 2014 (CN) .......................... 2014 1 0571012

(51) Int. Cl.
*B60K 1/04* (2006.01)
*B62D 21/02* (2006.01)
(Continued)

(52) U.S. Cl.
CPC ............... *B60K 1/04* (2013.01); *B62D 21/02* (2013.01); *B62D 21/157* (2013.01);
(Continued)

(58) Field of Classification Search
CPC B60K 1/04; B60K 2001/0438; B62D 29/008; B62D 25/025; B62D 21/02;
(Continued)

(56) References Cited

U.S. PATENT DOCUMENTS 2,431,524 A * 11/1947 Lindsay ................ B62D 21/10
280/795
2,613,986 A * 10/1952 Heyl, Jr. ................ B62D 23/00
280/797
(Continued)

FOREIGN PATENT DOCUMENTS

CN 101434264 A 5/2009
CN 101559705 A 10/2009
(Continued)

OTHER PUBLICATIONS

International Search Report dated Jan. 25, 2016 in corresponding Application No. PCT/CN2015/092194; 3 pgs.
(Continued)

*Primary Examiner* — Jacob B Meyer
(74) *Attorney, Agent, or Firm* — Dilworth & Barrese, LLP.; Michael J. Musella, Esq.

(57) ABSTRACT

An automobile battery protection structure includes a middle channel; two protection components symmetrically disposed on the left and right of the middle channel. Each of the protection components includes a vehicle door sill, a seat beam assembly, a floor panel, and a longitudinal beam. One end of the seat beam assembly is attached to the upper part of the vehicle door sill, and the other end of the seat beam assembly attached to the upper side of the middle channel.
(Continued)

One end of the floor panel is attached to the lower part of the vehicle door sill, and the other end of the floor panel is attached to the bottom side of the middle channel. The longitudinal beam is located under the floor panel, and longitudinally extending through the vehicle body. A car battery pack disposed under the middle channel.

6 Claims, 1 Drawing Sheet

(51) Int. Cl.
- *B62D 21/15* (2006.01)
- *B62D 25/02* (2006.01)
- *B62D 25/20* (2006.01)
- *B62D 29/00* (2006.01)
- *B62D 27/02* (2006.01)

(52) U.S. Cl.
CPC ....... *B62D 25/025* (2013.01); *B62D 25/2036* (2013.01); *B62D 29/008* (2013.01); *B60K 2001/0438* (2013.01); *B60Y 2306/01* (2013.01); *B62D 27/02* (2013.01)

(58) Field of Classification Search
CPC .. B62D 21/157; B62D 25/2036; B62D 27/02; B60Y 2306/01
See application file for complete search history.

(56) References Cited

U.S. PATENT DOCUMENTS

| | | | |
|---|---|---|---|
| 3,078,118 A * | 2/1963 | Dzienis | B62D 25/025 296/198 |
| 3,419,303 A * | 12/1968 | Eggert, Jr. | B62D 21/10 296/204 |
| 4,493,506 A * | 1/1985 | Alexander | B60R 13/04 293/128 |
| 4,514,008 A * | 4/1985 | Watanabe | B60K 15/073 280/835 |
| 5,388,885 A * | 2/1995 | Warren | B62D 21/14 296/203.03 |
| 5,560,674 A * | 10/1996 | Tazaki | B62D 21/09 296/193.01 |
| 5,613,727 A * | 3/1997 | Yamazaki | B62D 25/02 296/187.12 |
| 5,782,525 A * | 7/1998 | Honma | B62D 21/157 296/187.12 |
| 5,806,918 A * | 9/1998 | Kanazawa | B62D 21/07 296/187.09 |
| 5,849,122 A * | 12/1998 | Kenmochi | B60R 13/0815 156/182 |
| 5,921,618 A * | 7/1999 | Mori | B62D 21/157 296/187.12 |
| 5,984,402 A * | 11/1999 | Takeuchi | B62D 21/157 296/187.12 |
| 6,039,386 A * | 3/2000 | Hasshi | B62D 25/20 296/193.07 |
| 6,129,412 A * | 10/2000 | Tanuma | B62D 21/157 296/204 |
| 6,193,306 B1* | 2/2001 | Lee | B62D 25/02 296/181.4 |
| 7,178,861 B2* | 2/2007 | Yamada | B62D 21/09 296/187.08 |
| 7,413,242 B2* | 8/2008 | Rashidy | B60J 7/04 296/187.12 |
| 7,481,486 B2* | 1/2009 | Rashidy | B60J 7/04 296/107.01 |
| 7,540,343 B2* | 6/2009 | Nakashima | B60K 1/00 180/65.1 |
| 7,631,926 B2* | 12/2009 | Fonseka | B62D 21/157 296/146.6 |
| 7,654,352 B2* | 2/2010 | Takasaki | B60K 1/04 180/65.1 |
| 7,748,774 B2* | 7/2010 | Kurata | B62D 25/2018 296/187.08 |
| 8,052,206 B2* | 11/2011 | Wang | B62D 25/20 180/68.5 |
| 8,282,154 B2* | 10/2012 | Maruyama | B62D 25/02 296/193.05 |
| 8,308,227 B2* | 11/2012 | Tsuruta | B62D 21/157 296/209 |
| 8,439,430 B2* | 5/2013 | Sato | B62D 25/20 296/187.08 |
| 8,561,743 B2* | 10/2013 | Iwasa | B60K 1/04 180/68.5 |
| 8,602,488 B2* | 12/2013 | Mildner | B62D 25/20 296/193.07 |
| 8,696,051 B2* | 4/2014 | Charbonneau | B62D 21/157 296/187.12 |
| 8,720,980 B2* | 5/2014 | Weigl | B62D 25/20 296/193.07 |
| 8,739,907 B2* | 6/2014 | Storc | B60K 1/04 180/65.29 |
| 8,919,473 B2* | 12/2014 | Bisror | B60N 2/005 180/311 |
| 8,960,781 B2* | 2/2015 | Rawlinson | B60J 10/083 180/68.5 |
| 9,259,998 B1* | 2/2016 | Leanza | B60K 1/04 |
| 9,346,493 B2* | 5/2016 | Mildner | B62D 25/20 |
| 9,481,341 B2* | 11/2016 | Effenberger | B60R 22/1952 |
| 9,505,442 B2* | 11/2016 | Wu | B62D 21/157 |
| 9,616,939 B2* | 4/2017 | Natsume | B62D 25/2036 |
| 9,637,177 B2* | 5/2017 | Kang | B62D 25/2027 |
| 2006/0113131 A1* | 6/2006 | Kato | B60K 1/04 429/434 |
| 2007/0007054 A1* | 1/2007 | Nakashima | B60K 1/00 180/65.1 |
| 2007/0007060 A1* | 1/2007 | Ono | B60K 1/04 180/65.31 |
| 2008/0315629 A1* | 12/2008 | Abe | B62D 21/157 296/193.07 |
| 2009/0001769 A1* | 1/2009 | Kurata | B62D 25/2018 296/204 |
| 2009/0186266 A1* | 7/2009 | Nishino | B60K 1/04 429/120 |
| 2010/0264699 A1* | 10/2010 | Wang | B62D 25/20 296/193.07 |
| 2010/0273040 A1* | 10/2010 | Kubota | B60K 1/04 429/100 |
| 2010/0307848 A1* | 12/2010 | Hashimoto | B60K 1/04 180/68.5 |
| 2011/0132676 A1 | 6/2011 | Kodaira | |
| 2011/0297467 A1* | 12/2011 | Iwasa | B60K 1/04 180/65.31 |
| 2012/0049501 A1* | 3/2012 | Fujii | B60R 22/023 280/806 |
| 2012/0161472 A1* | 6/2012 | Rawlinson | B60K 1/04 296/187.08 |
| 2013/0088045 A1* | 4/2013 | Charbonneau | B62D 21/157 296/187.12 |
| 2015/0291124 A1* | 10/2015 | Effenberger | B60R 22/1952 280/806 |

FOREIGN PATENT DOCUMENTS

| | | |
|---|---|---|
| CN | 201321084 Y | 10/2009 |
| CN | 201546073 U | 8/2010 |
| CN | 201784713 U | 4/2011 |
| CN | 102897010 A | 1/2013 |
| CN | 102897228 A | 1/2013 |
| CN | 202879610 U | 4/2013 |
| CN | 204037691 U | 12/2014 |
| CN | 104340282 A | 2/2015 |
| JP | 2009003598 A | 4/2009 |
| KR | 20120056462 A | 6/2012 |

(56) References Cited

OTHER PUBLICATIONS

Chinese Office Action dated Feb. 1, 2016.
Chinese Office Action dated Aug. 22, 2016.
International Search Report dated Jan. 25, 2016.

* cited by examiner

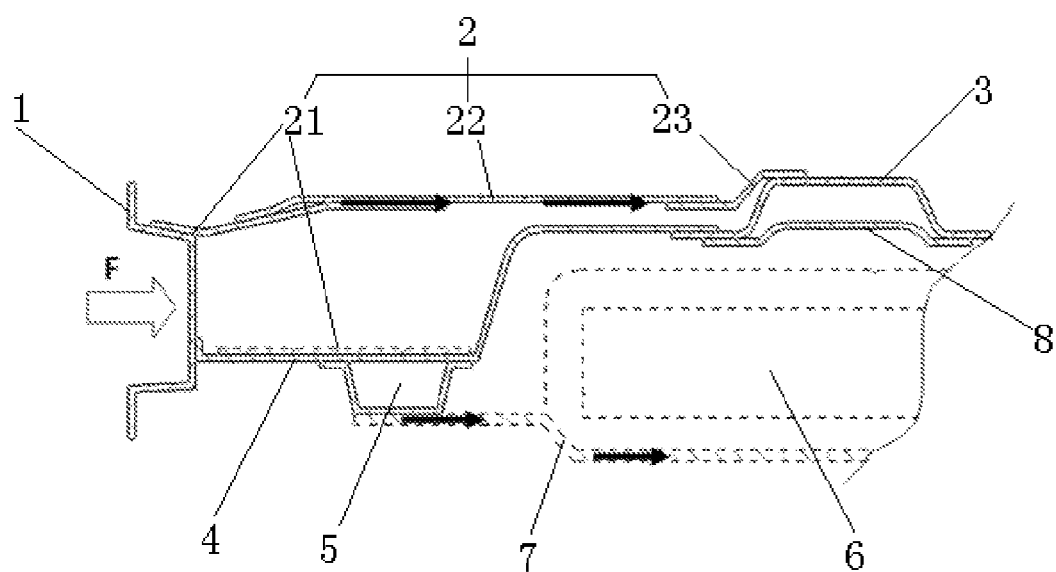

AUTOMOBILE BATTERY PROTECTION STRUCTURE

TECHNICAL FIELD

The present invention relates to the field of automobile, and particularly, relates to an automobile battery protection structure.

BACKGROUND

In the trend of energy conservation and environment protection in the automobile industry, electric cars appeal to customers because of their prospect in the automobile industry. Safety remains a top concern for customers. Especially when the vehicle body is subject to a side-impact collision, the automobile battery protection is critically important.

Existing electric vehicles usually have a longitudinal middle channel in the midst of the vehicle body bottom. On the left of the middle channel, the left car door sill is sequentially connected with the left floor panel and the middle channel. One end of the left seat beam assembly is connected to the left end of the left floor panel, while the other end of the left seat beam assembly is connected to the middle channel. The structures of the right and the left side of the middle channel are symmetrical. The battery usually is disposed below the middle channel. When the vehicle body is subjected to a side-impact collision, the impact caused by the collision can be transferred via the car door sill to the floor panel connected thereto, and released to other vehicle parts through the middle channel, thereby preventing the battery damage caused by the impact.

In the course of implementing the present invention, the inventors have found that the prior art has at least the following problems:

When the vehicle is subject to a side-impact collision, the tremendous impact caused by the side-impact collision can be mostly and rapidly transferred to the floor panel. The tremendous impact force instantly hits the floor panel but cannot be transferred and released promptly. This can cause the floor panel deform substantially and the deformed floor panel can contact with the automobile battery, thereby easily transferring the impact to the automobile battery and damaging it.

SUMMARY

In order to solve the problem that the battery can be damaged by the collision impact in the prior art, embodiments of the present invention provide an automobile battery protection structure. The techniques are as follows:

The automobile battery protection structure comprising: a middle channel in the midst of a vehicle body bottom longitudinally extending through the vehicle body; two protection components symmetrically disposed on the left and right of the middle channel, wherein each of the protection components includes a vehicle door sill, a seat beam assembly, a floor panel, and a longitudinal beam, one end of the seat beam assembly attached to the upper part of the vehicle door sill, and the other end of the seat beam assembly attached to the upper side of the middle channel; one end of the floor panel attached to the lower part of the vehicle door sill, and the other end of the floor panel attached to the bottom side of the middle channel; the longitudinal beam located under the floor panel, and longitudinally extending through the vehicle body; and a automobile battery pack disposed under the middle channel.

Specifically, the seat beam assembly comprises: an outer reinforcing plate, a seat beam, and an inner reinforcing plate sequentially connected. The outer reinforcing plate can be attached to the vehicle door sill, the inner reinforcing plate can be attached to the upper side of the middle channel, wherein the outer reinforcing plate, the seat beam, and the inner reinforcing plate can be deposited at different heights.

Preferably, the automobile battery protection structure further comprises a frame beam, the frame beam below the automobile battery pack. Both ends of the frame beam can be attached to the longitudinal beam of the two protection components respectively.

Furthermore, the longitudinal beam can be a U-shaped longitudinal beam. The top sides of the U-shaped longitudinal beam can be attached to the bottom surface of the floor panel. The bottom side of the U-shaped longitudinal beam can be attached to one end of the frame beam.

Preferably, the automobile battery protection structure further comprises a middle channel reinforcing plate. The middle channel reinforcing plate can be fixed to the bottom of the middle channel.

Furthermore, the lower end of the middle channel can have a protruding edge, wherein the protruding edge can be lap-jointed to the floor panel.

Preferably, the seat beam assembly, the floor panel, and the longitudinal beam can be made of alloys.

The advantage of the embodiments of the present invention is:

In the embodiments of the present invention, the seat beam assembly and the floor panel are both connected between the vehicle door sill and the middle channel respectively. When an automobile is subjected to a side-impact collision, the impact force created by the side-impact collision can be decomposed and transferred via the vehicle door sill by two pathways, to the seat beam assembly and the floor panel respectively, the seat beam assembly 2 and the floor panels 4 themselves can absorb a small portion of the impact force, and the remaining impact force can be quickly transferred out and unloaded from the two different pathways, reducing the risk of substantial deformation of the floor panel, and therefore preventing the automobile battery from being damaged by avoiding the floor panel's contact with the automobile battery. In addition, the seat beam assembly, the floor panel, and the middle channel can form the frame structure, therefore the rigid and strength of the overall protection structure can be improved significantly with the reinforcement of the longitudinal beam, and the risk of damaging the battery due to deformation of the entire protection structure is further reduced.

BRIEF DESCRIPTION OF THE DRAWINGS

To better describe the techniques in embodiments of the present invention, appended drawings for illustrating the embodiments of the present invention are briefly described below.

Obviously, the appended drawings in the following description only illustrate some of the embodiments of the present invention. The ordinary skilled in the art may derive additional drawings based on the appended drawings easily.

FIG. 1 is a cross-section of the left half of an automobile battery protection structure in accordance with an embodiment of the present invention.

Wherein, 1 vehicle door sill, 2 seat beam assembly, 21 outer reinforcing plate, 22 seat beam body, 23 inner reinforcing plate, 3 middle channel,
4 floor panel,
5 longitudinal beam,
6 automobile battery pack,
7 frame beam,
8 middle channel reinforcing plate.

DETAILED DESCRIPTION

To better describe the objectives, technical solutions, and advantages of the present invention, the embodiments of the present invention are described in details below with reference to the appended drawings.

Embodiment 1

The embodiment of the present invention provides the automobile battery protection structure as shown in FIG. 1. The automobile battery protection structure comprises: a middle channel 3 in the midst of a vehicle body bottom longitudinally extending there through; two protection components symmetrically disposed on the left and right of the middle channel 3; wherein each of the protection components includes a vehicle door sill 1, a seat beam assembly 2, a floor panel 4, and a longitudinal beam 5, one end of the seat beam assembly 2 attached to the upper part of the vehicle door sill 1, and the other end of the seat beam assembly 2 attached to the upper side of the middle channel 3; one end of the floor panel 4 attached to the lower part of the vehicle door sill 1, and another end of the floor panel 4 attached to the bottom side of the middle channel 3; the longitudinal beam 5 located under the floor panel 4, and longitudinally extending through the vehicle body; and a automobile battery pack 6 disposed under the middle channel 3.

Wherein, the vehicle door sill 1 can be located at a side of the vehicle body and extends from the front to the rear thereof. The vehicle door sill 1 can be attached to the floor panel 4 and the seat beam assembly 2 by spot welding. The longitudinal beam 5 attached to the seat beam assembly 2 and the floor panel 4 by spot welding or CO2 gas shielded welding can form a frame structure. FIG. 1 shows the cross-section of the left half structure in the embodiment of the present invention, the right half structure is symmetrical to the left half structure.

In the embodiment of the present invention, the seat beam assembly 2 and the floor panel 4 are both connected between the vehicle door sill 1 and the middle channel 3, respectively. When the automobile is subject to a side-impact collision, a force F created by the side impact can be decomposed and transferred via the vehicle door sill 1 by two pathways, to the seat beam assembly 2 and to the floor panel 4, respectively. The force F can be further transferred to additional components attached to the middle channel 3 via the middle channel 3. Compared with the current technology, the embodiment of the present invention can increase the pathways to transfer the impact force. Therefore, the impact force created by the side-impact collision can be transferred rapidly through multiple pathways, to unload the impact force and lower the risk of substantial deformation of the floor panel 4.

In the meanwhile, the seat beam assembly 2 and the floor panels 4 themselves can absorb a small portion of the impact force, resulting in reduction of the impact force needed to be further decomposed and transferred. The remaining impact force can be quickly transferred out and unloaded from the two different pathways, reducing the risk of significant deformation of the floor panel 4 and preventing the automobile battery from being damaged by avoiding the floor panel's contact with the automobile battery.

In addition, the vehicle door sill 1, the seat beam assembly 2, the floor panel 4, and the middle channel 3 can form the frame structure, therefore the rigid and strength of the overall protection structure can be improved significantly with the reinforcement of the longitudinal beam 5, which further reduces the risk of battery damage due to deformation of the entire protection structure.

Embodiment 2

The embodiment of the present invention provides the automobile battery protection structure as shown in FIG. 1. The automobile battery protection structure comprising: a middle channel 3 in the midst of a vehicle body bottom longitudinally extending there through; two protection components symmetrically disposed on the left and right of the middle channel 3, wherein each of the protection components includes a vehicle door sill 1, a seat beam assembly 2, a floor panel 4, and a longitudinal beam 5, one end of the seat beam assembly 2 attached to the upper part of the vehicle door sill 1, and the other end of the seat beam assembly 2 attached to the upper side of the middle channel 3, one end of the floor panel 4 attached to the lower part of the vehicle door sill 1, and the other end of the floor panel 4 attached to the bottom side of the middle channel 3, the longitudinal beam 5 located under the floor panel 4, and longitudinally extending through the vehicle body; and a automobile battery pack 6 disposed under the middle channel 3.

Specifically, as shown in FIG. 1, the seat beam assembly 2 comprises, an outer reinforcing plate 21, a seat beam body 22, and an inner reinforcing plate 23 sequentially connected. The outer reinforcing plate 21 can be attached to the vehicle door sill 1, and the inner reinforcing plate 23 can be attached to the upper side of the middle channel 3, wherein the outer reinforcing plate 21, the seat beam body 22, and the inner reinforcing plate 23 can be deposited at different height.

Wherein, the outer reinforcing plate 21 can be a U-shaped structure. One side of the outer reinforcing plate 21 can be attached to the seat beam body 22 and the vehicle door sill 1 respectively. The other side of the outer reinforcing plate 21 can be attached to the floor panel 4. When the vehicle door sill 1 transfers the impact force, the outer reinforcing plate 21 can absorb a portion of the impact load firstly, and then the seat beam body 22 and the inner reinforcing plate 23 can absorb a portion of the rest of the impact load and transfers the remaining thereof. The seat beam assembly 2 can be constructed with components at different height, such as the outer reinforcing plate 21, the seat beam body 22, and the inner reinforcing plate 23, to facilitate each of the components to absorb and transfer the impact force. Additionally, the sum of the impact force that the seat beam body 22, the lap-joint between the floor panel 4 and the longitudinal beam 5, and the lap-joint between the frame beam 7 and the longitudinal beam 5 could hold, can be larger than that the lap-joint between the floor panel 4 and the outer plate 21 could hold. When an automobile is subject to a side-impact collision, the outer reinforcing plate 21 may be deformed significantly to facilitate to absorb the impact force. Preferably, deformation of the seat beam body 22, the inner reinforcing plate 23, the floor panels 4, the longitudinal beam 5, and the frame beam 7 can be minimized, because they mainly transfer the impact force. However, each part of the seat beam assembly 2 should be strong enough so as not to be broken easily.

As shown in FIG. 1, preferably, the automobile battery protection structure further comprises the frame beam 7 below the automobile battery pack 6. The ends of the frame beam 7 can be attached to the longitudinal beam 5 of the two protection components, respectively. The frame beam 7 is located below the automobile battery pack 6, which can not only make the automobile battery pack 6 fixed, but can also increase the pathways to transfer the impact force. That is, through the floor panel 4, the frame beam 7, and the longitudinal beam 5 of one of the protection component, the impact force can be transfer to the longitudinal beam 5 of the other protection component. Meanwhile, the frame beam 7 can further be connected to other parts of the vehicle body, making it easier to transfer the impact force thereto, and preventing the automobile battery from being damaged.

As shown in FIG. 1, furthermore, the longitudinal beam 5 can be a U-shaped longitudinal beam. The top sides of the U-shaped longitudinal beam 5 can be attached to the bottom surface of the floor panel 4. The bottom side of the U-shaped longitudinal beam 5 can be attached to one end of the frame beam 7. The U-shaped longitudinal beam 5 can be a more stable structure.

As shown in FIG. 1, preferably, the automobile battery protection structure further comprises a middle channel reinforcing plate 8. The middle channel reinforcing plate 8 can be located at the bottom of the middle channel 3 and attached to the middle channel 3.

As shown in FIG. 1, furthermore, the lower ends of the middle channel 3 can have protruding edges lap-jointed to the floor panel 4.

Wherein, the middle channel 3 can be an n-shaped structure generally, the lower ends of the middle channel 3 can have two protruding edges extending sideways, and being lap-jointed to the corresponding floor panel 4 respectively, to form the stable structure. The middle channel reinforcing plate 8 can be deposited between the two protruding edges. The middle channel reinforcing plate 8 can also be n-shaped and fit tightly with the middle channel 3, resulting in significant improvement of the rigid and strength of the overall middle channel 3 and stability of the structure. When an automobile is subject to a side-impact collision, the inward impact force widthways the vehicle body can be transferred to the middle channel 3. Depending on the enforcement capability, the middle channel 3 can bear a portion of the impact force and transfers the remaining thereof out, for minimizing the vehicle body widthways deformation, and preventing the automobile battery under the middle channel 3 from being impacted by the vehicle body widthways deformation.

Preferably, the seat beam assembly 2, the floor panel 4, and the longitudinal beam 5 can be made of alloys.

Experiments prove, without the seat beam assembly 2, the impact force F of the side-impact collision can cause a significant inward deformation of the side the vehicle widthways the vehicle body. Thus, in order to protect the automobile battery, the automobile battery size can be shrunk to avoid interference with the side of the vehicle body. However, reduction of the automobile battery size can reduce the automobile battery capacity, resulting in reduction of vehicle driving range. In contrast, according to the embodiment of the present invention, the vehicle body side deformation is reduced as described above, therefore the corresponding automobile battery size can be increased, to ensure sufficient automobile battery capacity.

The present invention is described by, but not limit to, the above preferred embodiments. Any modification, alternative, or improvement following the principle of the present invention should fall within the protection scope of the present invention.

What claimed is:

1. An automobile battery protection structure comprising:
a middle channel in the midst of a vehicle body bottom longitudinally extending through the vehicle body;
two protection components symmetrically disposed on the left and right of the middle channel, wherein each of the protection components includes a vehicle door sill, a seat beam assembly, a floor panel, and a longitudinal beam, one end of the seat beam assembly attached to an upper part of the vehicle door sill, the other end of the seat beam assembly attached to an upper side of the middle channel, one end of the floor panel attached to a lower part of the vehicle door sill, the other end of the floor panel attached to a bottom side of the middle channel, the longitudinal beam located under the floor panel, and the longitudinal beam longitudinally extending through the vehicle body; and
an automobile battery pack disposed under the middle channel;
wherein the seat beam assembly comprises an outer reinforcing plate, a seat beam body, and an inner reinforcing plate sequentially connected, the outer reinforcing plate attached to the vehicle door sill, the inner reinforcing plate attached to the upper side of the middle channel, and the outer reinforcing plate, the seat beam body, and the inner reinforcing plate deposited at different heights.

2. The automobile battery protection structure in claim 1, further comprising a frame beam, wherein the frame beam is below the automobile battery pack, and both ends of the frame beam are attached to the longitudinal beam of the two protection components respectively.

3. The automobile battery protection structure according to claim 2, wherein the longitudinal beam is a U-shaped longitudinal beam, a top side of the U-shaped longitudinal beam is attached to a bottom surface of the floor panel, and a bottom side of the U-shaped longitudinal beam is attached to an end of the frame beam.

4. The automobile battery protection structure according to claim 1, further comprising a middle channel reinforcing plate, the middle channel reinforcing plate fixed to the bottom of the middle channel.

5. The automobile battery protection structure according to claim 4, wherein the middle channel comprises a protruding edge at a lower end of the middle channel, the protruding edge is attached to the floor panel.

6. The automobile battery protection structure according to claim 1, wherein the seat beam assembly, the floor panel, and the longitudinal beam are made of alloys.

* * * * *